United States Patent
Cromer et al.

(10) Patent No.: US 8,688,906 B2
(45) Date of Patent: Apr. 1, 2014

(54) APPARATUS AND METHOD FOR DISTRIBUTING WRITES ASYMMETRICALLY AMONG DRIVES

(75) Inventors: Daryl Cromer, Cary, NC (US); Donald R. Frame, Apex, NC (US); Jeffrey R. Hobbet, Holly Springs, NC (US); Michael Scott Mettler, Durham, NC (US)

(73) Assignee: Lenovo (Singapore) Pte. Ltd., Tech Park (SG)

(*) Notice: Subject to any disclaimer, the term of this patent is extended or adjusted under 35 U.S.C. 154(b) by 843 days.

(21) Appl. No.: 12/619,389

(22) Filed: Nov. 16, 2009

(65) Prior Publication Data

US 2011/0119443 A1    May 19, 2011

(51) Int. Cl.
*G06F 12/00*    (2006.01)

(52) U.S. Cl.
USPC .................... 711/114; 711/E12.001

(58) Field of Classification Search
USPC ............................ 711/114, E12.001
See application file for complete search history.

(56) References Cited

U.S. PATENT DOCUMENTS

| | | | | |
|---|---|---|---|---|
| 5,694,581 A * | 12/1997 | Cheng | ............................. | 710/7 |
| 6,609,176 B1 * | 8/2003 | Mizuno | ........................ | 711/114 |
| 2005/0283655 A1 * | 12/2005 | Ashmore | ......................... | 714/7 |
| 2009/0204758 A1 * | 8/2009 | Luning | ........................ | 711/114 |
| 2011/0238938 A1 * | 9/2011 | Kloeppner et al. | ........... | 711/162 |

* cited by examiner

*Primary Examiner* — Mardochee Chery
(74) *Attorney, Agent, or Firm* — Kunzler Law Group

(57) ABSTRACT

An apparatus and method are disclosed for distributing writes asymmetrically. An asymmetric distribution module calculates an asymmetric distribution of writes for a plurality of drives. A write module writes data to each drive in accordance with the asymmetric distribution of writes.

20 Claims, 6 Drawing Sheets

APPARATUS AND METHOD FOR DISTRIBUTING WRITES ASYMMETRICALLY AMONG DRIVES

BACKGROUND

1. Field

The subject matter disclosed herein relates to distributing writes and more particularly relates to distributing writes among drives.

2. Description of the Related Art

As data is written to a data storage drive, referred to hereinafter as a drive, the physical media of the drive gradually degrades. This wearing out of the drive typically eventually leads to failure and replacement of the drive. Unfortunately, when multiple drives degrade concurrently, particularly redundant drives, two or more drives can fail at about the same time. Multiple drive failures are particularly disastrous in systems designed to recover from the failure of only a single drive.

SUMMARY

From the foregoing discussion, there is a need for an apparatus and method that asymmetrically distributes writes among drives. Beneficially, such an apparatus and method would degrade at least one drive faster than other drives.

The embodiments of the present invention have been developed in response to the present state of the art, and in particular, in response to the problems and needs in the art that have not yet been fully solved by currently available write allocation methods. Accordingly, the embodiments have been developed to provide an apparatus and method for asymmetrically distributing writes that overcome many or all of the above-discussed shortcomings in the art.

The apparatus to asymmetrically distribute writes is provided with a plurality of modules. The modules include an asymmetric distribution module and a write module.

The asymmetric distribution module calculates an asymmetric distribution of writes for a plurality of drives. The write module writes data to each drive in accordance with the asymmetric distribution of writes.

A method is presented for distributing writes asymmetrically. The method may perform the functions of the apparatus. In one embodiment, the method includes calculating an asymmetric distribution and writing data.

An asymmetric distribution module calculates an asymmetric distribution of writes for a plurality of drives. A write module writes data to each drive in accordance with the asymmetric distribution of writes.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of the embodiments as set forth hereinafter.

BRIEF DESCRIPTION OF THE DRAWINGS

In order that the advantages of the embodiments will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Many of the functional units described in this specification have been labeled as modules, in order to more particularly emphasize their implementation independence. Modules may include hardware circuits such as one or more processors with memory, Very Large Scale Integration (VLSI) circuits, gate arrays, programmable logic, and/or discrete components. The hardware circuits may perform logic functions, execute computer readable programs stored on tangible storage devices, and/or execute programmed functions. Modules may also include a computer readable storage medium comprising a computer readable program stored on a tangible storage device that performs a function when executed by a hardware circuits such as a processor, microcontroller, or the like.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Figure 1:
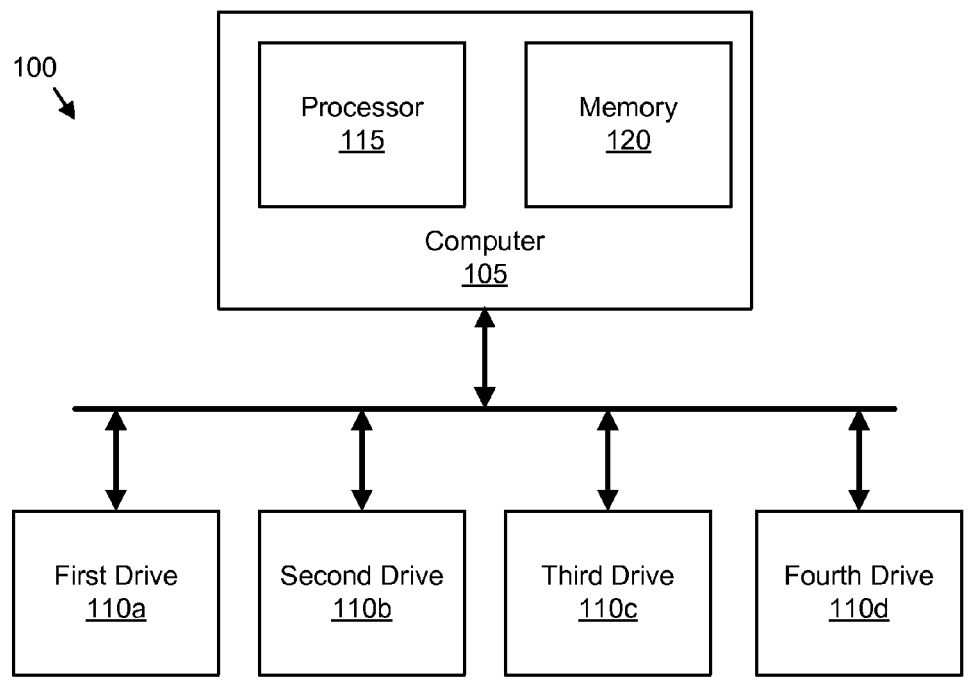
FIG. 1 is a schematic block diagram illustrating one embodiment of a storage system.

FIG. 1 is a schematic block diagram illustrating one embodiment of a storage system 100. The system 100 includes a computer 105 and the plurality of drives 110. In one embodiment, the computer 105 is a storage controller. The computer 105 includes a memory 120 that may be a computer readable storage medium storing a computer readable program. The processor 115 may execute the computer readable program.

Although for simplicity four drives 110 are shown, one of skill in the art will recognize that embodiments may be practiced with any number of drives 110. In one embodiment, each drive 110 is a SSD. Alternatively, one or more drives 110 may be hard disk drives, optical storage drives, holographic storage drives, micromechanical storage drives, and the like.

In one embodiment, the computer 105 may redundantly store data across two or more of the drives 110. For example, the computer 105 may store of first instance of data on a first drive 110a and a second instance of the data on a second drive 110b.

In one embodiment, the drives 110 are organized as a RAID. The RAID drives 110 may redundantly store data according to one or more RAID schemes. The RAID schemes may include a RAID 5, a RAID 6, a RAID 50, and a RAID 60 scheme.

Figure 2:
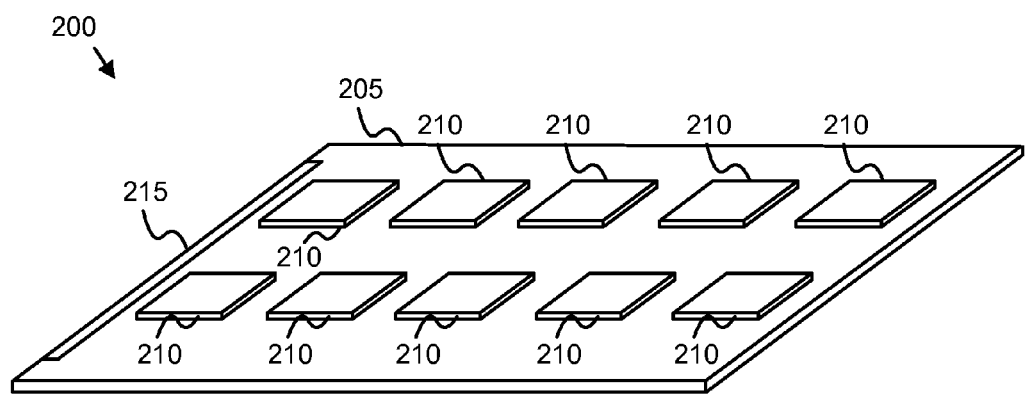
FIG. 2 is a perspective drawing illustrating one embodiment of a Solid State Drive (SSD)

FIG. 2 is a perspective drawing illustrating one embodiment of a SSD 200. The SSD 200 may be a drive 110 of FIG. 1. The description of the SSD 200 refers to elements of FIG. 1, like numbers referring to like elements. The SSD 200 includes a printed circuit board 205, semiconductor components 210, and a connector 215.

The semiconductor components 210 may be fabricated of semiconductor gates on one or more semiconductor substrates. Each semiconductor substrate may be packaged and mounted on the printed circuit board 205. Connections between the semiconductor components 210 may be through semiconductor metal layers, substrate-to-substrate wiring, traces through the printed circuit board 205, and/or wires connecting the semiconductor components 210. The semiconductor components 210 may be flash memory devices. Alternatively, the semiconductor components 210 may be micromechanical memory devices.

The connector 215 may connect the SSD 200 to a chassis, the computer 105, or the like. One of skill the art will recognize that embodiments may be practiced with the SSD 200 in alternate configurations such as a dual in-line memory module (DIMM).

Figure 3:
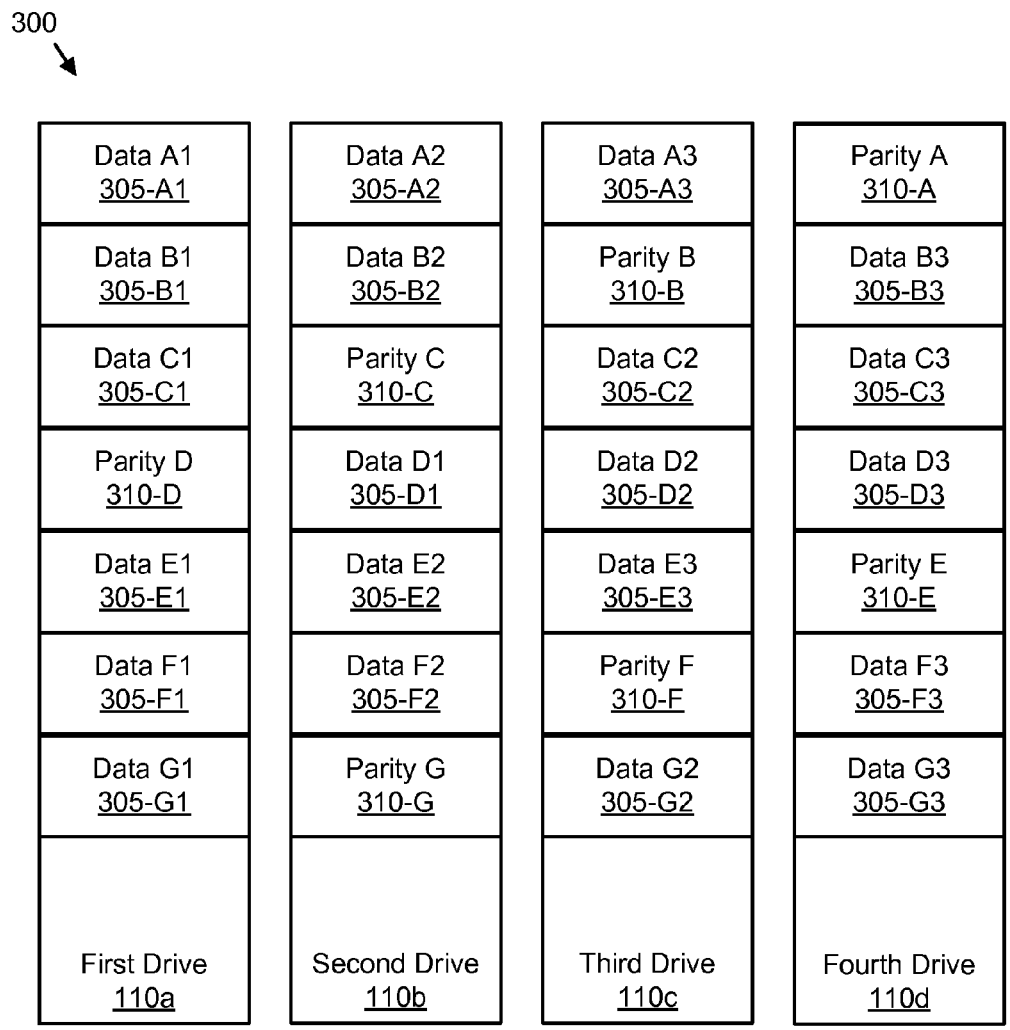
FIG. 3 is a schematic block diagram illustrating one embodiment of Redundant Array of Independent Disks (RAID) drive data spaces.

FIG. 3 is a schematic block diagram illustrating one embodiment of RAID drive data spaces 300. The data spaces 300 may represent the organization of data stored on the drives 110 of FIG. 1 when configured with a RAID scheme. The description of the data spaces 300 refers to elements of FIGS. 1-2, like numbers referring to like elements. Although for simplicity, the data spaces 300 of the four drives 110 of FIG. 1 are shown, any number of drives 110 may be employed.

The data spaces 300 are shown as striped to implement a RAID 5 scheme, although embodiments may be practiced with other RAID schemes. A stripe may be a data stripe 305 or parity stripe 310. In one embodiment, each stripe 305, 310 comprises a specified number of data blocks on a drive 110. The stripes 305, 310 may be allocated on the drives 110 during an initialization process, a formatting process, or the like. For example, the computer 105 may initialize the drives 110 by defining stripes 305, 310 for each drive 110.

In the depicted embodiment, stripes 305, 310 are organized in groups of four stripes 305, 310. Each group includes three data stripes 305 and one parity stripe 310. The parity stripes 310 are distributed symmetrically among the drives 110. Embodiments may be practiced with other arrangements of stripes 305, 310.

The computer 105 writes data to the data stripes 305. In addition, the computer 105 calculates parity data from the data and stores the parity data to the parity stripe 310. In one embodiment, the parity data is calculated as an exclusive or (XOR) of the data stored in data stripes 305 on two or more drives 110. For example, the computer 105 may write data to data stripe A1 305-A1, data stripe A2 305-A2, and data stripe A3 305-A3. The computer 105 may further XOR the data stored on the data stripe A1 305-A1, the data stripe A2 305-A2, and the data stripe A3 305-A3 to create the parity data, and store the parity data on parity stripe A 310-A.

If any of the drives 110 subsequently fail, the data for the stripe group A stored on the failed drive 110 can be recovered from the remaining drives 110. For example, if a third drive 110c fails, the data for stripe group A can be recovered from the data stripe A1 305-A1, the data stripe A2 305-A2, and the parity stripe A 310-A.

When the data of the stripe group is modified, the modified data may be rewritten to the stripe group. Typically, only a portion of the data will be modified. As a result, the modified data may be written to one data stripe 305 with recalculated parity data written to the parity stripe 310.

Figure 4:
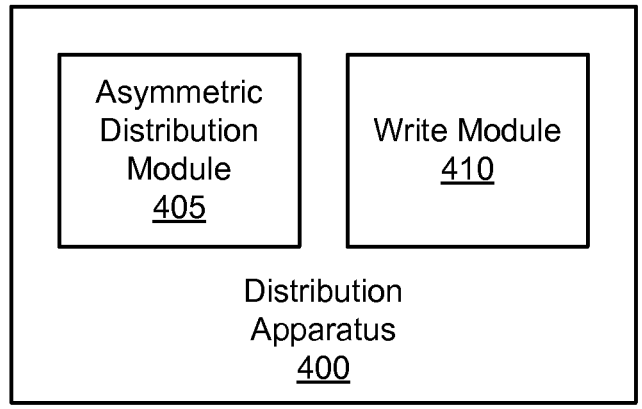
FIG. 4 is a schematic block diagram illustrating one embodiment of a distribution apparatus.

FIG. 4 is a schematic block diagram illustrating one embodiment of a distribution apparatus 400. The apparatus 400 may be embodied in the computer 105 of FIG. 1. The description of the apparatus 400 refers to elements of FIGS. 1-3, like numbers referring to like elements. The apparatus 400 includes an asymmetric distribution module 405 and a write module 410.

In one embodiment, the asymmetric distribution module 405 and the write module 410 comprise a plurality of semiconductor logic gates. The semiconductor logic gates may be organized in a semiconductor device.

In an alternate embodiment, the asymmetric distribution module 405 and the write module 410 may comprise a computer readable storage medium. The computer readable storage medium may be the memory 120 of FIG. 1. The computer readable storage medium may store a computer readable program on a tangible storage device such as semiconductor logic. The processor 115 may execute the computer readable program to perform the functions of the asymmetric distribution module 405 and the write module 410.

The asymmetric distribution module 405 calculates an asymmetric distribution of writes for a plurality of drives 110. The asymmetric distribution may be calculated to increase the probability that a specified drive 110 will fail before the other drives 110 in the system 100. In one embodiment, the probability that the specified drive 110 will fail before the other drives 110 is in the range of 75% to 99.9%. In a certain embodiment, the probability of the specified drive 110 will fail before the other drives 110 is in the range of 95% to 99.9%.

In one embodiment, the asymmetric distribution of writes allocates disproportionately more writes to the specified drive 110 and/or to one or more specified drives 110. In an alternate embodiment, the asymmetric distribution of writes disproportionately allocates data that is likely to be rewritten to the specified drive 110 and/or to one or more specified drives 110. In a certain embodiment, the asymmetric distribution of writes disproportionately allocates parity stripes 310 to the specified drive 110 and/or to one or more specified drives 110.

The write module 410 writes data to each drive 110 in accordance with the asymmetric distribution. For example, if the asymmetric distribution of writes disproportionately allocates data that is likely to be rewritten to the first drive 110*a*, the write module may write data for a web browser cache or other frequently rewritten types data to the first drive 108. Alternatively, if the asymmetric distribution of writes allocates 60% of writes to the first drive 110*a*, the write module 410 may write data 60% of the time to the first drive 110*a*.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
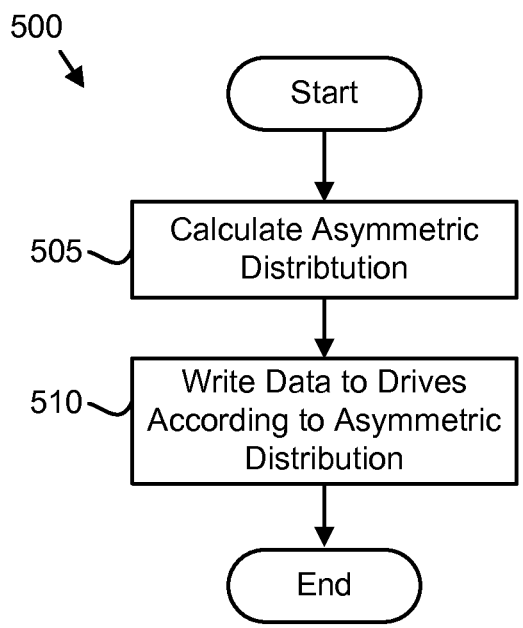
FIG. 5 is a schematic flow chart diagram illustrating one embodiment of an asymmetric write distribution method.

FIG. 5 is a schematic flow chart diagram illustrating one embodiment of an asymmetric write distribution method 500. The description of the method 500 refers to elements of FIGS. 1-4, like numbers referring to like elements. The method 500 substantially includes the steps to carry out the functions presented above with respect to the operation of the described apparatus and system of FIGS. 1-4.

In one embodiment, the method 500 is implemented with semiconductor logic. Alternatively, the method 500 may be implemented with a computer readable storage medium comprising a computer readable program stored on a tangible storage device. The computer readable storage medium may be integrated into a computing system, such as the computer 105, wherein the computer readable program executed by the computing system performs the method 500.

The method 500 starts, and the asymmetric distribution module 405 calculates 505 an asymmetric distribution of writes for a plurality of drives 110. In one embodiment, the asymmetric distribution module 405 calculates 505 the asymmetric distribution of writes based on a Mean Writes Between Failures (MWBF) estimate. The MWBF may estimate a number of times a data block in a drive 110 may be written to before the data block fails. In one embodiment, the MWBF λ is used to calculate a failure distribution. Equation 1 illustrates one embodiment of a failure distribution F(w), where w is a number of writes to a drive 110.

$$F(w)=1-e^{-\lambda w}$$ Equation 1

In one embodiment, the asymmetric distribution module 405 calculates 505 the asymmetric distribution of writes so that for a first number of estimated writes $w_1$ to a specified drive 110 and a second number of estimated writes $w_2$ to other drives 110, a failure distribution for the specified drive 110 $F(w_1)$ is in the range of 20% to 60% greater than a failure distribution for the other drives 110 $F(w_2)$.

In one example, the asymmetric distribution may specify that 46% of writes to the drives 110 are to a fourth drive 110*d* and that each of the other three drives 110*a-c* in the four drive system 100 depicted in FIG. 1 receive 18% of writes to the drives 110. This exemplary asymmetric distribution may provide a 95% probability that the fourth drive 110*d* will fail before any of the first, second, or third drives 110*a-c* fail.

In an alternate embodiment, the asymmetric distribution of writes is based on a type of data. Long-lived data such as application program data, audio files, and the like may be written once and then rarely rewritten, while short-loved data such as e-mail messages, documents, and the like may be frequently written, erased, and written over with new data. For example, the asymmetric distribution may specify that 46% of short-lived data be written to the fourth drive 110*d* while 18% of the short-lived data is written to each of the first, second, and third drives 110*a-c*.

In one embodiment, the asymmetric distribution of writes is calculated using Equation 2, where m is a number of drives 110, n is a number of parity stripes per parity group, k is a constant, $w_3$ is an estimated number writes to parity stripes 310, and $w_4$ is an estimated number writes to data stripes 305.

$$w_3=k(m-n)w_4$$ Equation 2

The failure distribution F(w) is calculated for each drive 110 using Equation 3.

$$F(w)=1-e^{-\lambda(w3+w4)}$$ Equation 3

The asymmetric distribution of parity stripes 310 is calculated so that the percentage of parity stripes allocated to the specified drive 110 yields a failure distribution $F(w_s)$ in the range of 20% to 60% greater than a failure distribution for the other drives 110 $F(w_o)$.

The write module 410 writes 510 data to each drive 110 in accordance with the asymmetric distribution and the method 500 ends. For example, The write module 410 may write 510 46% of new data blocks to the fourth drive 110*d* and 18% of new data blocks to the first, second, and third drives 110*a-c*. By writing 510 data to each drive 110 in accordance with the asymmetric distribution of writes, the method 500 increases the probability a specified drive 110 will fail before other drives 110 in the system 100, avoiding a concurrent failure of two or more drives 110.

Figure 6:
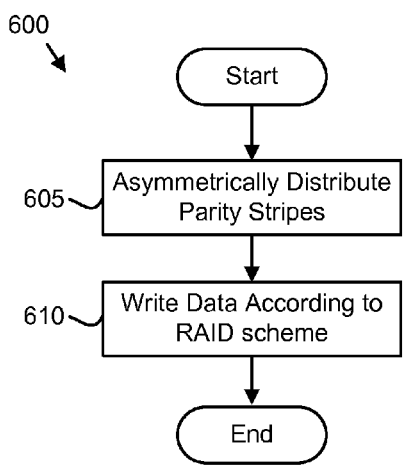
FIG. 6 is a schematic flow chart diagram illustrating one embodiment of a parity stripe asymmetric write distribution method.

FIG. 6 is a schematic flow chart diagram illustrating one embodiment of a parity stripe asymmetric write distribution method 600. The description of the method 600 refers to elements of FIGS. 1-5, like numbers referring to like elements. The method 600 substantially includes the steps to implement one embodiment of step 510 of the method 500 of FIG. 5 in a RAID system. In one embodiment, the method 600 is implemented with semiconductor logic. Alternatively, the method 600 may be implemented with a computer readable storage medium comprising a computer readable program stored on a tangible storage device. The computer readable storage medium may be integrated into a computing system, such as the computer 105, wherein the computer readable program executed by the computing system performs the method 600.

The method 600 starts, and in one embodiment, the write module 410 asymmetrically distributes 605 parity stripes 310 among a plurality of drives 110. The asymmetric distribution module 405 may asymmetrically distribute 605 the parity stripes 310 according to the asymmetric distribution of writes calculated in step 505 of FIG. 5. The parity stripes 310 may be asymmetrically distributed 605 among the drives 110 during an initialization of the drives 110. Alternatively, the asymmetric distribution module 405 may asymmetrically distribute 610 the parity stripes 310 by modifying a previous striping initialization.

The write module 410 writes 610 data to the data stripes 305 and parity stripes 310 according to the RAID scheme of the system 100 and the method 600 ends. As a result, a drive 110 with the larger number of parity stripes 310 than other drives 110 will receive disproportionately more writes as will be illustrated hereafter in FIG. 9. Thus no additional tracking or management of writes to the drives 110 is required to achieve the asymmetric distribution of writes.

Figure 7:
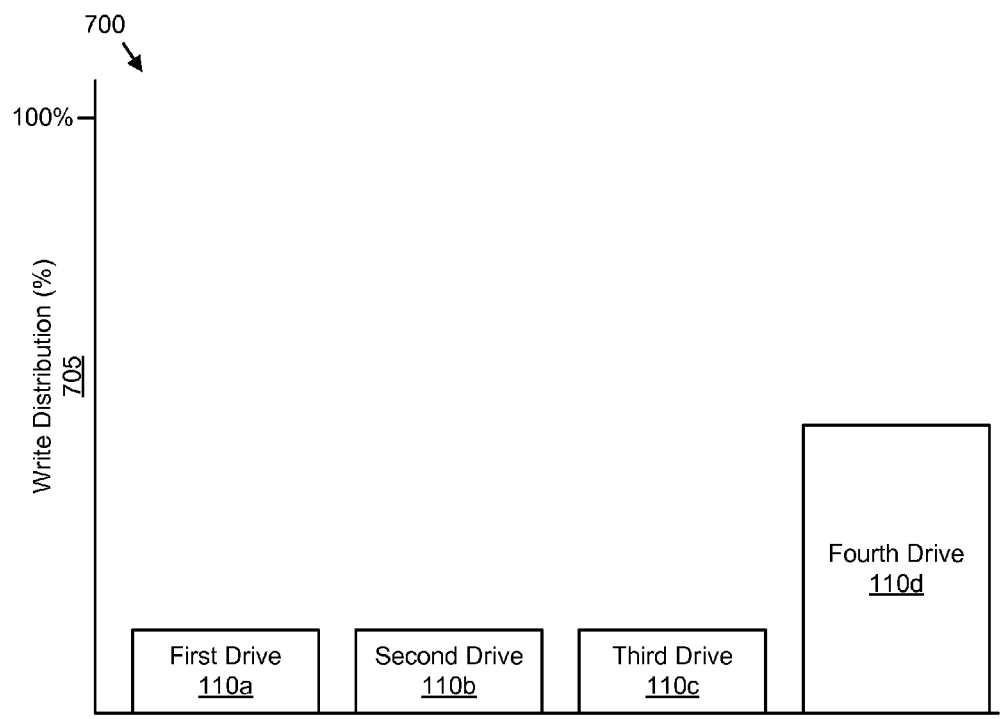
FIG. 7 is a graph illustrating one embodiment of an asymmetric distribution of writes.

FIG. 7 is a graph illustrating one embodiment of an asymmetric distribution of writes 700. The asymmetric distribution 700 may be asymmetric distribution calculated in step 505 of the method 500 of FIG. 5. The description of the asymmetric distribution 700 refers to elements of FIGS. 1-6, like numbers referring to like elements.

The asymmetric distribution 700 includes graph with a vertical axis representing a write distribution 705. The write distribution 705 indicates the percentage of all writes that are written to a drive 110. The graph further depicts horizontal axis listing the drives 110. The vertical height of each drive 110 represents the percentage of all writes that are estimated to be written to the drive 110.

In the depicted asymmetric distribution 700, the first drive 110a, the second drive 110b, and the third drive 110c each have a write distribution of 18%. The fourth drive 110d is depicted with a write distribution of 46%.

Figure 8:
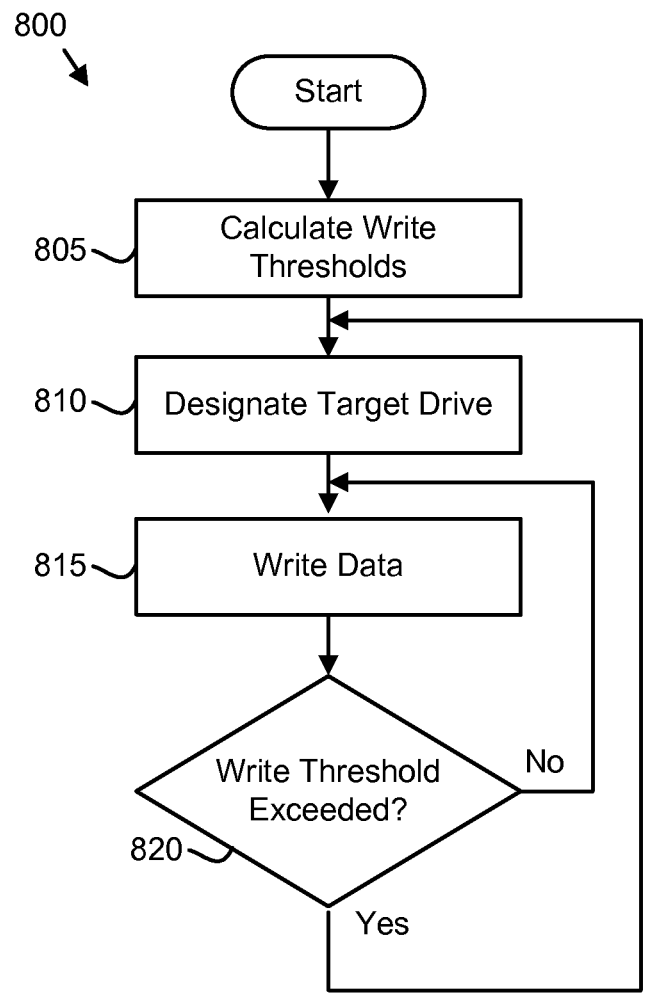
FIG. 8 is a schematic flow chart diagram illustrating one embodiment of an asymmetric write method.

FIG. 8 is a schematic flow chart diagram illustrating one embodiment of an asymmetric write method 800. The description of the method 800 refers to elements of FIGS. 1-5, like numbers referring to like elements. The method 800 substantially includes the steps to implement one embodiment of step 510 of the method 500 of FIG. 5 in a RAID system. In one embodiment, the method 800 is implemented with semiconductor logic. Alternatively, the method 800 may be implemented with a computer readable storage medium comprising a computer readable program stored on a tangible storage device. The computer readable storage medium may be integrated into a computing system, such as the computer 105, wherein the computer readable program executed by the computing system performs the method 800.

The method 800 starts, and in one embodiment, the write module 410 calculates 805 a write threshold for each drive 110 of the plurality of drives 110a-d proportional to the asymmetric distribution of writes for the drive 110. In one example, using the asymmetric distribution 700 illustrated in FIG. 7, the write module 410 may calculate 805 a first write threshold of 3600 writes for the first drive 110a, 3600 writes for the second drive 110b, 3600 writes for the third drive 110c, and 9200 writes for the fourth drive 110d. In one embodiment, each write comprises one write to one data block on the drive 110. Alternatively, each write may comprise one write to a plurality of data blocks on the drive 110.

In one embodiment, the write module 410 designates 810 a first drive 110a of the plurality of drives 110a-d as a target drive. The write module 410 may further write 815 data to the target drive. In a certain embodiment, the write module 410 exclusively writes 815 data to the target drive.

The write module 410 may determine 820 that the write threshold for the first drive 110a is exceeded. Continuing the example above, if the write module 410 has written 815 3601 writes to the first drive 110a, the write module 410 may determine 820 at the write threshold for the first drive 110a is exceeded.

If the write module 410 determines 820 at the write threshold for the first drive 110a is not exceeded, the write module 410 continues writing 815 data to the target drive. If the write module 410 determines 820 that the write threshold for the first drive 110a is exceeded, the write module 410 designates 810 a second drive 110b of the plurality of drives 110a-d as the target drive. Thus the method 800 directs writes to each of the drives 110 in turn in accordance with the asymmetric distribution 700.

Figure 9:
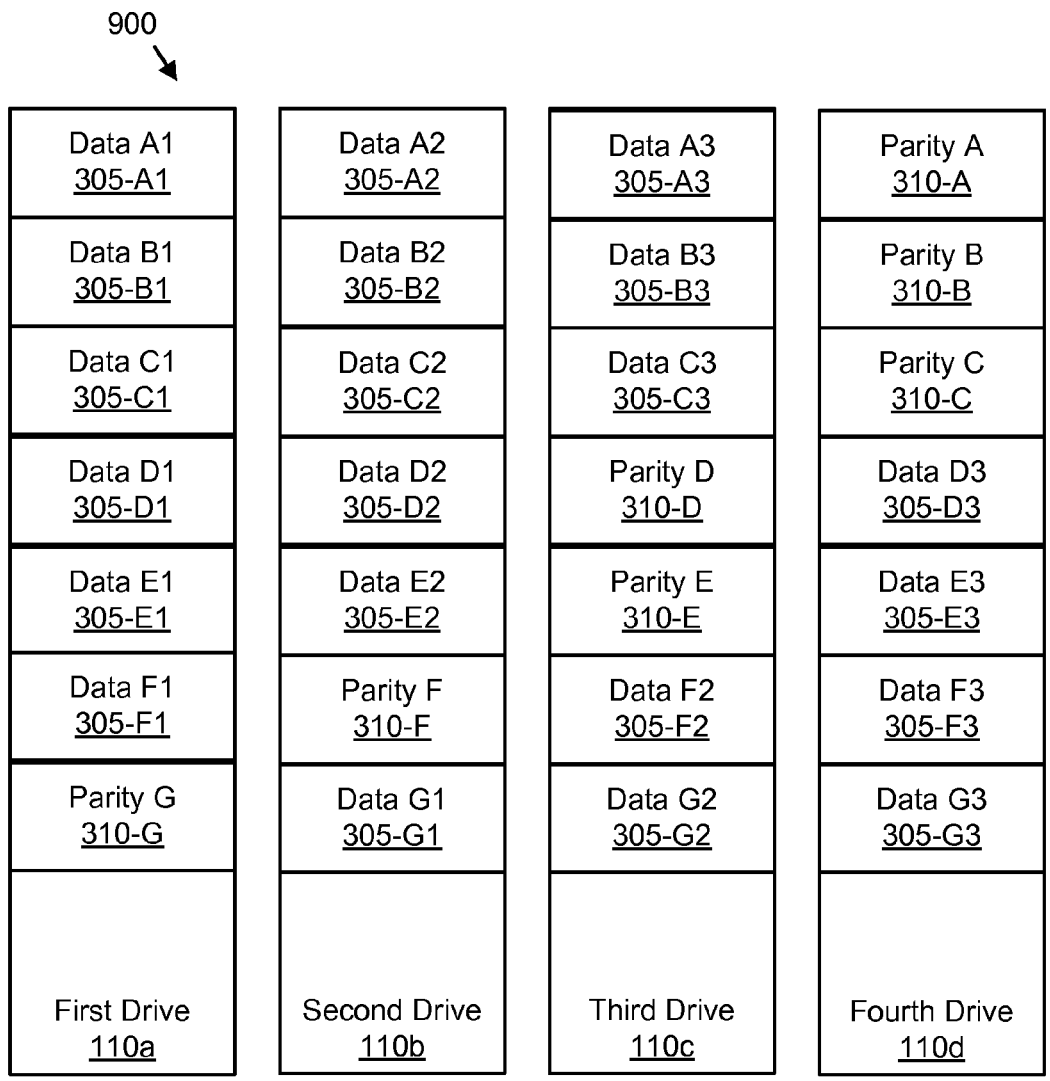
FIG. 9 is a schematic block diagram illustrating one embodiment of RAID drive data spaces with asymmetrically distributed parity stripes.

FIG. 9 is a schematic block diagram illustrating one embodiment of RAID drive data spaces 900 with asymmetrically distributed parity stripes. The data spaces 900 are the data spaces 300 FIG. 3 with the parity stripes 310 asymmetrically distributed 605 as described in step 605 of FIG. 6 in accordance with an asymmetric distribution 700. The description of the data spaces 900 refers to elements of FIGS. 1-8, like numbers referring to like elements.

The parity stripes 310 are asymmetrically distributed 605 among the drives 110. As depicted, the fourth drive 110d includes parity stripes 310 for three parity groups, parity stripe A 310-A, parity stripe B 310-B, and parity stripe C 310-C. The third drive 110c includes parity stripes 310 for two parity groups, parity stripe D 310-d and parity stripe E 310-E. The second drive 110b includes a parity stripe 310 for one parity group, parity stripe F 310-F. The first drive 110a includes a parity stripe 310 for one parity group, parity stripe G 310-G.

Because the parity stripes 310 are asymmetrically distributed 605 among the drives 110, the drives 110 with more parity stripes 310 will receive more writes than the drives 110 with fewer parity stripes 310. As result, writes will be asymmetrically distributed according to the asymmetric distribution 700, resulting in the fourth drive 110d failing before the first, second, and third drives 110a-c.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    an asymmetric distribution module calculating an asymmetric distribution of writes for a plurality of drives with disproportionately more short-lived writes for a target drive by calculating a write threshold for each drive of the plurality of drives proportional to the asymmetric distribution of writes such that a probability based on the write thresholds for the plurality of drives that the target drive fails before any other drive of the plurality of drives fails exceeds a probability threshold; and
    a write module writing data to each drive in accordance with the asymmetric distribution of writes.

2. The apparatus of claim 1, wherein the plurality of drives is organized as a Redundant Array of Independent Disks (RAID) and parity stripes are asymmetrically distributed among the plurality of drives in accordance with the asymmetric distribution of writes and the data is written to the plurality of drives according to a RAID scheme.

3. The apparatus of claim 2, wherein the RAID scheme is selected from the group consisting of a RAID 5 scheme, a RAID 6 scheme, a RAID 50 scheme, and a RAID 60 scheme.

4. The apparatus of claim 1, the write module writing the data to each drive in accordance with the asymmetric distribution of writes by:
designating a first drive of the plurality of drives as the target drive;
writing data to the target drive;
determining that the write threshold for the first drive is exceeded; and
designating a second drive of the plurality of drives as the target drive.

5. The apparatus of claim 1, wherein each write threshold is a specified number of writes and the asymmetric distribution is calculated using a Mean Writes Between Failures (MWBF) estimate of times a data block may be written to before the data block fails, wherein a failure distribution $F(w)$ for each drive is calculated as $F(w)=1-e^{-\lambda w}$ where $\lambda$ is a MWBF for the drive and w is the specified number of writes to the drive.

6. The apparatus of claim 1, wherein each of the plurality of drives are Solid State Drives (SSD).

7. The apparatus of claim 1, the write module redundantly storing first data across at least two drives of the plurality of drives.

8. A computer readable storage medium storing a computer readable program on a tangible storage device, wherein the computer readable program when executed on a computer causes the computer to:
calculate an asymmetric distribution of writes for a plurality of drives with disproportionately more short-lived writes for a target drive by calculating a write threshold for each drive of the plurality of drives proportional to the asymmetric distribution of writes such that a probability based on the write thresholds for the plurality of drives that the target drive fails before any other drive of the plurality of drives fails exceeds a probability threshold; and
write data to each drive in accordance with the asymmetric distribution of writes.

9. The computer readable storage medium of claim 8, wherein the plurality of drives are organized as a RAID and parity stripes are asymmetrically distributed among the plurality of drives in accordance with the asymmetric distribution of writes and the data is written to the plurality of drives according to a RAID scheme.

10. The computer readable storage medium of claim 9, wherein the RAID scheme is selected from the group consisting of a RAID 5 scheme, a RAID 6 scheme, a RAID 50 scheme, and a RAID 60 scheme.

11. The computer readable storage medium of claim 8, wherein the computer readable program further causes the computer to write the data to each drive in accordance with the asymmetric distribution of writes by:
designating a first drive of the plurality of drives as the target drive;
writing data to the target drive;
determining that the write threshold for the first drive is exceeded; and
designating a second drive of the plurality of drives as the target drive.

12. The computer readable storage medium of claim 8, wherein each write threshold is a specified number of writes and the asymmetric distribution is calculated using a Mean Writes Between Failures (MWBF) estimate of times a data block may be written to before the data block fails, wherein a failure distribution $F(w)$ for each drive is calculated as $F(w)=1-e^{-\lambda w}$ where $\lambda$ is a MWBF for the drive and w is the specified number of writes to the drive.

13. The computer readable storage medium of claim 8, wherein each of the plurality of drives are SSD.

14. The computer readable storage medium of claim 8, wherein the computer readable program further causes the computer to redundantly store first data across at least two drives of the plurality of drives.

15. A method comprising:
calculating an asymmetric distribution of writes for a plurality of drives with disproportionately more short-lived writes for a target drive by calculating a write threshold for each drive of the plurality of drives proportional to the asymmetric distribution of writes such that a probability based on the write thresholds for the plurality of drives that the target drive fails before any other drive of the plurality of drives fails exceeds a probability threshold; and
writing data to each drive in accordance with the asymmetric distribution of writes.

16. The method of claim 15, wherein the plurality of drives is organized as a RAID and parity stripes are asymmetrically distributed among the plurality of drives in accordance with the asymmetric distribution of writes and the data is written to the plurality of drives according to a RAID scheme.

17. The method of claim 16, wherein the RAID scheme is selected from the group consisting of a RAID 5 scheme, a RAID 6 scheme, a RAID 50 scheme, and a RAID 60 scheme.

18. The method of claim 15, the method writing the data to each drive in accordance with the asymmetric distribution of writes by:
designating a first drive of the plurality of drives as the target drive;
writing data to the target drive;
determining that the write threshold for the first drive is exceeded; and
designating a second drive of the plurality of drives as the target drive.

19. The method of claim 15, wherein each write threshold is a specified number of writes and the asymmetric distribution is calculated using a Mean Writes Between Failures (MWBF) estimate of times a data block may be written to before the data block fails, wherein a failure distribution $F(w)$ for each drive is calculated as $F(w)=1-e^{-\lambda w}$ where $\lambda$ is a MWBF for the drive and w is the specified number of writes to the drive.

20. The method of claim 15, wherein each of the plurality of drives are SSD.

* * * * *